United States Patent
Ribeiro et al.

(10) Patent No.: US 9,602,178 B2
(45) Date of Patent: Mar. 21, 2017

(54) JOINT PRECODER AND RECEIVER DESIGN FOR MU-MIMO DOWNLINK

(71) Applicant: NOKIA CORPORATION, Espoo (FI)

(72) Inventors: Cássio Barboza Ribeiro, Espoo (FI); Carl Wijting, Espoo (FI); Ugurlu Umut, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 63 days.

(21) Appl. No.: 14/312,136

(22) Filed: Jun. 23, 2014

(65) Prior Publication Data

US 2015/0372727 A1    Dec. 24, 2015

(51) Int. Cl.
*H04B 7/02* (2006.01)
*H04B 7/04* (2006.01)
(Continued)

(52) U.S. Cl.
CPC ......... *H04B 7/0456* (2013.01); *H04B 7/0452* (2013.01); *H04B 7/0619* (2013.01); *H04B 7/0848* (2013.01)

(58) Field of Classification Search
CPC ....... H04L 25/0204; H04L 2025/03426; H04L 27/2647; H04L 25/0242; H04L 2025/03496; H04L 25/0328; H04B 7/0626; H04B 7/0417; H04B 7/04; H04B 7/0413; H04B 7/0452; H04B 7/0456; H04B 7/0634;
(Continued)

(56) References Cited

U.S. PATENT DOCUMENTS 7,535,969 B2 * 5/2009 Catreux ............... H04B 7/0615
375/260
8,385,395 B2 * 2/2013 Dietl .................... H04B 7/0417
375/224
(Continued)

OTHER PUBLICATIONS

Federico Boccardi et al., "Precoding Schemes for the MIMO-GBC", Int. Zurich Seminar on Communications, Feb. 22-24, 2006, pp. 10-13.
(Continued)

*Primary Examiner* — Rahel Guarino
(74) *Attorney, Agent, or Firm* — Squire Patton Boggs (US) LLP

(57) ABSTRACT

Various communication systems may benefit from joint precoder and receiver designs for multi-user multiple-input and multiple-output. For example, machine-type communication in long term evolution communication systems may benefit from such designs. A method can include determining channel status information of a current connection. The method can also include indicating the channel status information to a transmitter. The method can further include receiving weight values for a first receiver filter, in response to the channel status information. The method can also include defining the first receiver filter based on the weight values. The method can further include determining effective channel status information of a current connection, and interference from other transmitters. The method can also include defining a second receiver filter based on the weight values, the effective channel status information of the current connection, and the interference.

21 Claims, 7 Drawing Sheets

(51) Int. Cl.
*H04B 7/06* (2006.01)
*H04B 7/08* (2006.01)

(58) Field of Classification Search
CPC ........ H04B 7/06; H04B 7/0639; H04B 17/24;
H04B 17/345; H04B 7/0443; H04B
7/0636; H04B 7/0673; H04B 1/7103;
H04B 7/02; H04B 7/0404
USPC ............... 375/267, 299, 347, 346, 349, 285;
455/63.1, 500, 103, 307, 114.2
See application file for complete search history.

(56) References Cited

U.S. PATENT DOCUMENTS

| | | | | |
|---|---|---|---|---|
| 2007/0211823 | A1* | 9/2007 | Mazzarese | H04B 7/0452 |
| | | | | 375/299 |
| 2009/0195455 | A1* | 8/2009 | Kim | H04B 7/0617 |
| | | | | 342/377 |
| 2010/0172256 | A1* | 7/2010 | Mallik | H04B 7/0417 |
| | | | | 370/252 |
| 2012/0190309 | A1* | 7/2012 | Tang | H04B 7/0413 |
| | | | | 455/69 |
| 2013/0223269 | A1* | 8/2013 | To | H04L 25/03955 |
| | | | | 370/252 |
| 2014/0204841 | A1* | 7/2014 | Ruiz Delgado | H04B 7/0689 |
| | | | | 370/328 |

OTHER PUBLICATIONS

Max H. M. Costa, "Writing on Dirty Paper", IEEE Transactions on Information Theory, vol. IT-29, No. 3, May 1983, pp. 439-441.

Spencer et al., "Zero-Forcing Methods for Downlink Spatial Multiplexing in Multiuser MIMO Channels" IEEE Transactions on Signal Processing, vol. 52, No. 2, Feb. 2004 (11 pages).

Shenouda et al., "Tomlinson-Harashima Precoding for Broadcast Channels with Uncertainty" IEEE Journal on Selected Areas in Communications, vol. 25, No. 7, Sep. 2007 (10 pages).

Nihar Jindal, "MIMO Broadcast Channels With Finite-Rate Feedback" IEEE Transactions on Information Theory, vol. 52, No. 11, Nov. 2006 (16 pages).

Stankovic et al., "Generalized Design of Multi-User MIMO Precoding Matrices" IEEE Transactions on Wireless Communications, vol. 7, No. 3, Mar. 2008 (9 pages).

* cited by examiner

JOINT PRECODER AND RECEIVER DESIGN FOR MU-MIMO DOWNLINK

BACKGROUND

Field

Various communication systems may benefit from jointly designing the precoder and receivers for multi-user multiple-input and multiple-output (MU-MIMO). For example, machine-type communication in long term evolution (LTE) communication systems may benefit from such devices. Such devices may take into account imperfect channel state information (CSI) and joint optimization of transmitters and receivers.

Description of the Related Art

Generally, MU-MIMO is a technique for achieving higher multiplexing gain in wireless communications systems. MU-MIMO has been supported in 3GPP LTE since Rel-8. Optimal sum-capacity for MU-MIMO systems conventionally requires computationally intensive processing, which is not feasible for practical wireless systems, such as, for example, systems based on dirty-paper coding (DPC). An example of such systems is described in M.H.M. Costa, "Writing on dirty paper," *IEEE Transactions on Information Theory*, vol. 29, no. 3, pp. 439-441, May 1983, the contents of which are incorporated herein in their entirety. Hence, linear precoding can be the de facto standard scheme for the suppression of multi-user interference (MUI) in MU-MIMO transmissions.

As described in, for example, F. Boccardi, et al., "Precoding schemes for the MIMO-GBC," in Proc. Int. Zurich Seminar on Communications, Zurich, 2006, pp. 10-13 (the contents of which are incorporated herein in their entirety), although linear precoders do not have the same rate/power efficiency ratio as the DPC-based schemes, they can still achieve the same multiplexing gain. For example, zero-forcing precoders may cancel the MUI entirely under the assumption of perfect CSI, after which the signal-to-noise ratio (SNR) of the MUI-free system can be maximized by block diagonalization in case of multi-antenna terminals. Other linear precoders may maximize the signal-to-interference plus noise ratio (SINR) based on the maximum signal-to-leakage plus noise ratio or the minimum mean square error (MMSE) criterion.

The assumption of perfect CSI is not realistic in wireless systems, and hence residual MUI may always be present. Thus, it may be beneficial to address the problem of jointly designing precoder and receiver under the assumption of imperfect CSI, such that it may be possible to address both MUI minimization and maximization of the gain of the useful signal for each receiver.

MU-MIMO may be generally applied as a technique for wireless communications systems. Linear precoding and block diagonalization from various literatures may also be generally applied. There is presently no practical technique or signaling procedure supporting joint optimization of the transmitter and receiver under imperfect CSI, particularly in high SNR environments, in which the signaling overhead is relatively tolerable.

SUMMARY

According to certain embodiments, a method can include determining channel status information of a current connection. The method can also include indicating the channel status information to a transmitter. The method can further include receiving weight values for a first receiver filter, in response to the channel status information. The method can also include defining the first receiver filter based on the weight values. The method can further include determining effective channel status information of a current connection, and interference from other transmitters. The method can also include defining a second receiver filter based on the weight values, the effective channel status information of the current connection, and the interference.

According to other embodiments, a method can include receiving channel status information from a receiver. The method can also include defining a first transmit filter based on the channel status information. The method can further include transmitting weight values for a receiver filter of a receiver.

An apparatus according to certain embodiments can include at least one processor, and at least one memory including computer program code. The at least one memory and the computer program code can be configured to, with the at least one processor, cause the apparatus at least to determine channel status information of a current connection. The at least one memory and the computer program code can also be configured to, with the at least one processor, cause the apparatus at least to indicate the channel status information to a transmitter. The at least one memory and the computer program code can further be configured to, with the at least one processor, cause the apparatus at least to receive weight values for a first receiver filter, in response to the channel status information. The at least one memory and the computer program code can also be configured to, with the at least one processor, cause the apparatus at least to define the first receiver filter based on the weight values. The at least one memory and the computer program code can further be configured to, with the at least one processor, cause the apparatus at least to determine effective channel status information of a current connection and interference from other transmitters. The at least one memory and the computer program code can also be configured to, with the at least one processor, cause the apparatus at least to define a second receiver filter based on the weight values.

Another apparatus according to certain embodiments can include at least one processor, and at least one memory including computer program code. The at least one memory and the computer program code can be configured to, with the at least one processor, cause the apparatus at least to receive channel status information from a receiver. The at least one memory and the computer program code can also be configured to, with the at least one processor, cause the apparatus at least to define a first transmit filter based on the channel status information. The at least one memory and the computer program code can further be configured to, with the at least one processor, cause the apparatus at least to transmit weight values for a receiver filter of the receiver.

BRIEF DESCRIPTION OF THE DRAWINGS

For proper understanding of the invention, reference should be made to the accompanying drawings, wherein.

DETAILED DESCRIPTION

Figure 1:
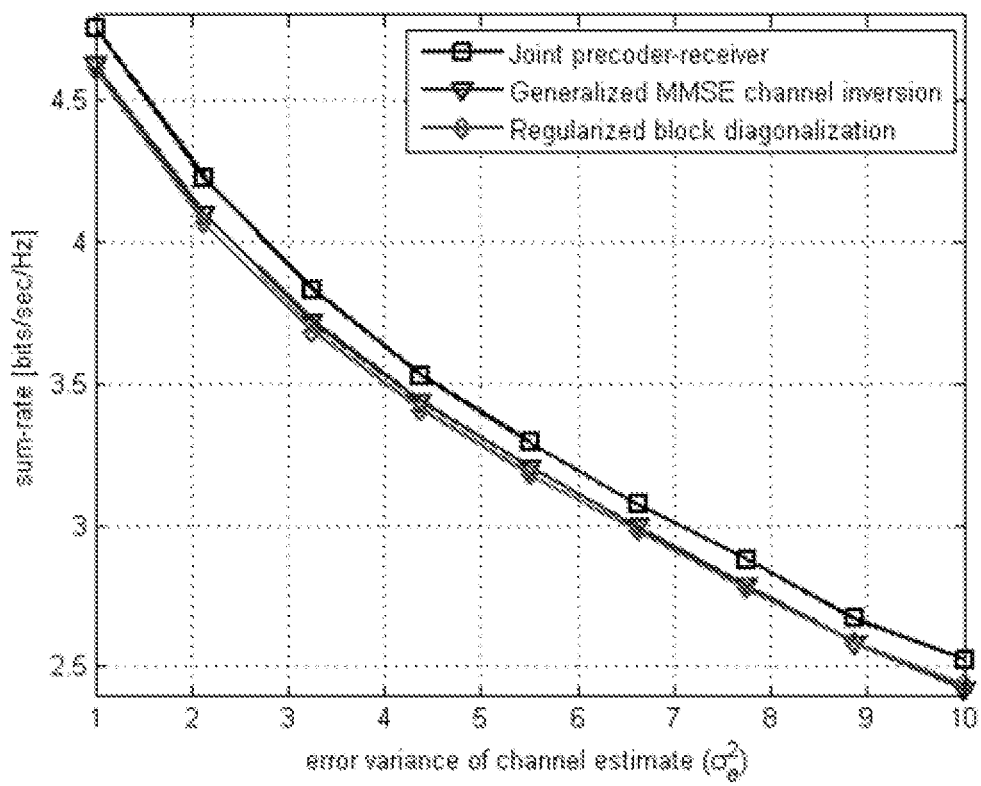
FIG. 1 illustrates performance benefit according to certain embodiments.

Certain embodiments may be applicable in joint linear design of precoders and receivers with imperfect CSI, where it may be assumed that the variance of the channel estimation error is known. According to certain embodiments, two precoders and two receivers may be considered.

The first precoder and receiver may be designed by joint optimization via iteration based on the MMSE criterion, where two target channel matrices that are designed for high SNR conditions may be defined and used. An iterative algorithm may be used to jointly optimize filters for MUI suppression.

The second precoder and receiver may be applied based on singular value decomposition to maximize the gain of the useful signal at each terminal. The target channel matrices may allow overlooking a power constraint on the precoder or to avoid an unknown Lagrange multiplier of the Lagrange method. Thus, improvements in computational efficiency may be achieved.

According to certain embodiments, optimization of the first set of transmitter and receiver filters may be carried out by a base station (BS), based on CSI which is obtained by either user equipment (UE) feedback or uplink-downlink reciprocity in time division duplex (TDD) systems. The CSI acquisition via UE feedback can be realized by first measuring and transmitting the CSI from UE to BS based on a codebook or another quantization scheme. The CSI acquisition via channel reciprocity can be fulfilled in TDD systems by measuring the uplink CSI and transforming it to downlink CSI based on the characteristics of the transceiver at BS. The second set of filters can be designed independently at the base station and each receiving UE, based on the knowledge of the first set of filters.

In order to achieve the above or for other purposes, according to certain embodiments, the base station may design a first set of transmitter and receiver filters that minimize the total mean squared error (MSE) under the assumption of imperfect CSI. The base station may also schedule UEs for MU-MIMO transmission and send the related scheduling information. Furthermore, the base station may also indicate to each receiving UE the receiver weights that it is supposed to apply. According to certain embodiments, the indication can be made by implicit feed-forward, or can be based on a codebook or any other quantization scheme.

According to certain embodiments, the base station may also transmit the data for each MU-MIMO scheduled UE using the weights designed for the first set of transmitter and receiver filters. The base station may also apply a second set of transmit filters to maximize the SNR for each receiving UE. Each receiving UE may apply the receiving weights indicated by the base station to each receiving UE, as well as another receiving filter designed to maximize the SNR at the receiver, such as, for example, based on the singular value decomposition (SVD) of the effective channel, or other advanced receivers, such as linear minimum mean square error (LMMSE) or minimum mean square error-interference rejection combiner (MMSE-IRC).

FIG. 1 illustrates an example of performance benefit that can be obtained by the schemes described above according to certain embodiments, compared to conventional linear precoding design without jointly optimizing the receiver. Specifically, relationships between various sum-rates and channel state information are shown, with respect to conditions of joint precoder-receiver, generalized MMSE channel inversion and regularized block. Further, it can be seen from FIG. 1 that techniques or procedures supporting joint optimization of precoder and receiver result in better performance as compared to generalized MMSE channel inversion and regularized block diagonalization.

According to certain embodiments, the precoder and receiver may be defined by $$W = \frac{1}{\alpha} W_1 W_2$$

and $D = \alpha D_2 D_1$, where $\alpha \in \mathbb{R}_+$ is the gain controller. The first pair of filters, $W_1$ and $D_1$, are used to mitigate the MUI, after which $W_2$ and $D_2$ are used to maximize the gain of the useful signal.

The mean square error of the received signal at the $j^{th}$ UE may be given by $$\text{MSE}_j = \mathbb{E}\{Tr\{(r_j - G_j s_j)(r_j - G_j s_j)^H\}|H_{est,j}\}$$

where $G_j$ is the target channel matrix, $H_{est,j}$ is the channel estimate, $s_j$ is the transmitted signal, and $r_j$ is the received signal at the $j^{th}$ UE. The estimation error of the $j^{th}$ UE's channel can be given by $H_{err,j} = H_j - H_{est,j}$, where $H_j$ denotes the true channel response, and $\mathbb{E}\{H_{est,j} H_{err,j}^H\} = 0$ is assumed.

According to other embodiments, two target channel matrices, $G_j^{(1)}$ and $G_j^{(2)}$ may be constructed to approximate the ideal gain of the useful signal under high SNR for the $j^{th}$ UE, which may be designed by $$G_j^{(1)} = D_{2,j} D_{1,j} H_j \bar{V}_j W_{2,j}$$

$$G_j^{(2)} = D_{2,j} \bar{U}_j^H H_j W_{1,j} W_{2,j}$$

where $\bar{V}_j$ and $\bar{U}_j$ are taken from the $n_R(j)$ columns of the right and left-singular matrices of $H_j$ that correspond to the largest eigenvalues, where $n_R(j)$ denotes the number of antennas at the $j^{th}$ UE. Furthermore, $D_{1,j}$, $D_{2,j}$, and $W_{2,j}$ denote block submatrices of the block-diagonal $D_1$, $D_2$, and $W_2$, whereas $W_{1,j}$ denote the column-wise submatrices of $W_1$. Thus, $D_1 = \text{diag}(D_{1,1}, \ldots, D_{1,J})$, $D_2 = \text{diag}(D_{2,1}, \ldots, D_{2,J})$, $W_2 = \text{diag}(W_{2,1}, \ldots W_{2,J})$, and $W_1 = [W_{1,1}, \ldots W_{1,J}]$ hold.

After taking the gradient of the total mean square error, which may include $\text{TMSE} = \Sigma_{j=1}^J \text{MSE}_j$, with respect to $W_{1,j}^H$ and $D_{1,j}^H$ for every j (provided $G_j = G_j^{(1)}$ and $G_j^{(2)}$, respectively), and setting them to zero, the filters $W_j$ and $D_j$ may be obtained as $$W_{1,j} = \left[\sum_{i=1}^J H_{est,i}^H D_{1,i}^H D_{1,i} H_{est,i} + \frac{\sigma_n^2}{P_{max}}\|D_1\|_F^2 I + \sigma_e^2\|D_1\|_F^2 I\right]^{-1} (H_{est,j}^H D_{1,j}^H D_{1,j} H_{est,j} + \sigma_e^2\|D_{1,j}\|_F^2 I)\bar{V}_j$$

$$D_{1,j} = \bar{U}_j^H (\sigma_e^2\|W_{1,j}\|_F^2 I + H_{est,j} W_{1,j} W_{1,j}^H H_{est,j}^H) \left[H_{est,j}\left(\sum_{i=1}^J W_{1,i} W_{1,i}^H\right) H_{est,j}^H + \frac{\sigma_n^2}{P_{max}}\|W_1\|_F^2 I + \sigma_e^2\|W_1\|_F^2 I\right]^{-1}$$

where $P_{max}$ denotes the maximum transmit power at BS, a denotes the noise variance at any UE, $\sigma_e^2$ denotes the error variance of the channel estimates. The error variance can be estimated by the base station for each UE via stochastic processes or quantization error estimation methods, as described, for example, in M. B. Shenouda, et al., "Tomlinson-Harashima precoding for broadcast channels with uncertainty," *IEEE Journal on Selected Areas in Communications*, vol. 25, no. 7, pp. 1380-1389, September 2007, and N. Jindal, "MIMO broadcast channels with finite-rate feedback," *IEEE Transactions on Information Theory*, vol. 52, no. 11, pp. 5045-5060, November 2006, respectively, the contents of which are incorporated herein by reference in their entirety.

The joint filter design follows the iterative use of the above equations) for optimization. The algorithm can be initiated by $W_1^{(0)}=I$ and $D_{1,j}^{(0)}=I$ for all j. At the $i^{th}$ iteration, $W_{1,j}^{(i)}$ and $D_{1,j}^{(i)}$ are calculated for j=1, . . . , J. The algorithm may halt when $\|D_1^{(i)}-D_1^{(i-1)}\|_F^2 < \delta$ for some small $\delta$.

According to other embodiments, such a joint filter design can also be adopted by a plurality of transmitting nodes in a distributed manner, such as, for example, coordinated multipoint (CoMP), where each transmitter controls only its resource allocation. Upon the CSI indication of each group of scheduled receivers to their serving transmitters, the precoding and receiving filters can be coordinately designed with dedicated back-end signaling either jointly at a centralized processing unit, or separately by every transmitter. The designed filters can be distributed from the centralized processor to every corresponding transmitter. Upon reception, the transmitters may indicate the derived weights of the receiver weights towards the corresponding scheduled receivers.

Additionally, the second precoder, $W_2$, may be optionally used as a block diagonal matrix, each block of which may be designed by the right-singular matrix of $D_{1,j}H_{est,j}W_{1,j}$ for each j. The second receive filter, $D_{2,j}$, may be designed at every UE based on the aggregate effective channel $H_{eff}=D_1H_{est}W_1W_2$ using weights of $D_1$ which are provided by the base station. When there is interference from other transmitters at present, the second receive filter, $D_{2,j}$, may be designed as $D_{2,j}=H_{eff,j}^H(\sigma_n^2 I+\tilde{R}_{est,j})^{-1}$ where $\tilde{R}_{est,j}$ denotes the estimated covariance matrix of the interference from other transmitters and thermal noise, and $H_{em}$ denotes the effective channel at the $j^{th}$ UE. The algorithm for joint precoder and receiver design is depicted by the flowchart in FIG. 2.

According to certain embodiments, effective channel status information may refer to the overall channel status observed by the UE. From the UE's point of view, the estimation procedure may be the same as before. However, the channel status information may include both the channel and the impact of the filters.

According to other embodiments, the second receiver filter, $D_2$, can be realized by whitening the total interference followed by maximum ratio combining (MRC) filtering. This can be achieved by the estimation of the covariance of the aggregate interference and thermal noise by the UE. Alternatively, the second receiver filter, $D_2$, can be based on joint Max-Log-Maximum A Posteriori (MAP) detection, which may also incorporate the estimation of the interference modulation at the UE based on maximum likelihood criterion. In other embodiments, any other advanced filtering methods can also be adopted by the second receiver filter, $D_2$.

Figure 2:
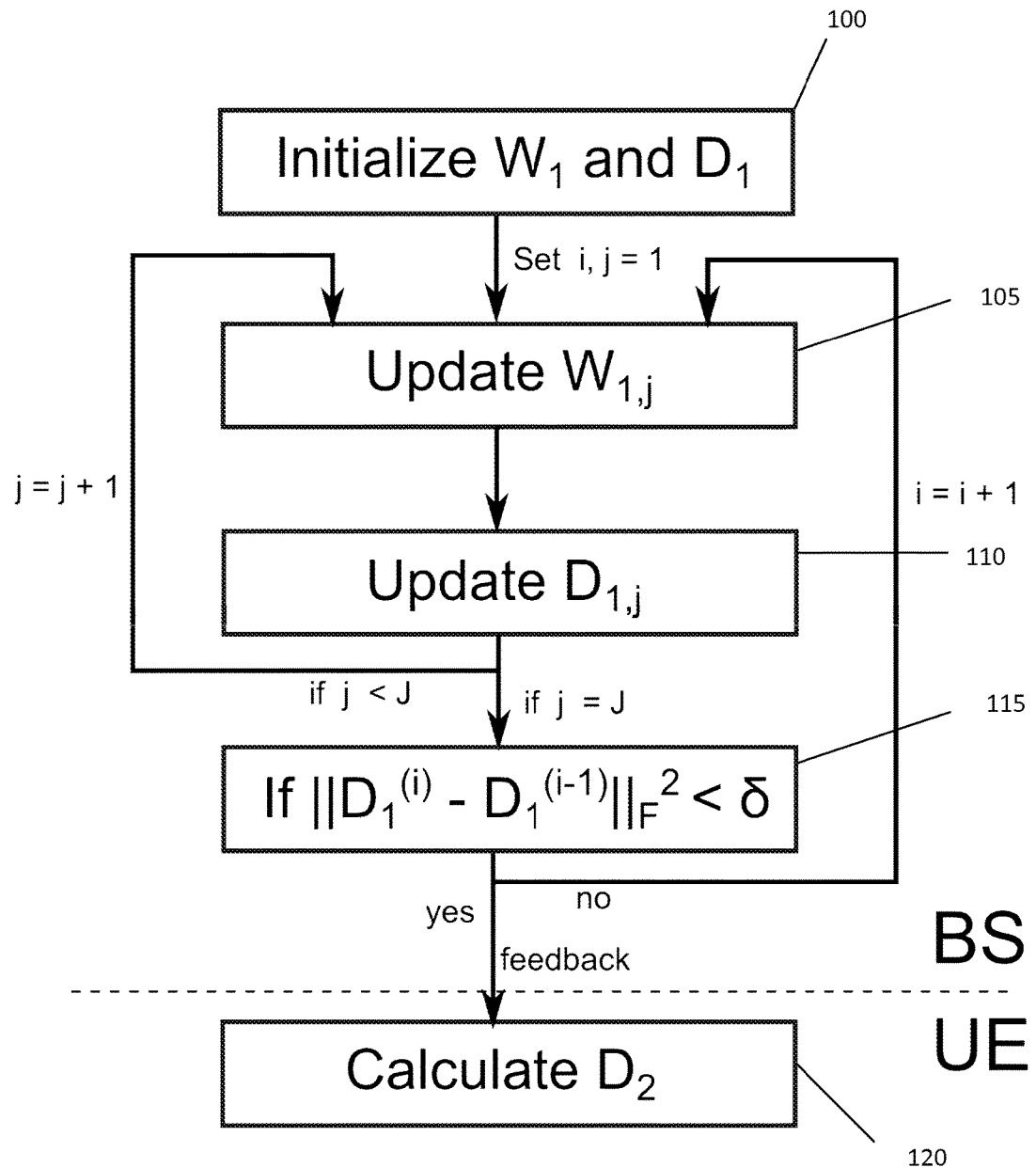
FIG. 2 illustrates a flowchart of a process according to certain embodiments.

FIG. 2 illustrates a flowchart of joint precoder-receiver optimization according to certain embodiments. In particular, 100, 105, 110 and 115 may be performed at the base station end, and 120 may be performed at the UE end. At 100, initialization of $W_1$ and $D_1$ may be performed. Here, i may be set as i=1, and j may be set as j=1. At 105, $W_{1,j}$ may be updated. At 110, $D_{1,j}$ may be updated. Then, if j satisfies j<J, the flow returns to the update of $W_{1,j}$, whereas, if j satisfies j=J, then the flow may proceed to 115. At 115, if $\|D_1^{(i)}-D_1^{(i-1)}\|_F^2 < \delta$ is satisfied, then, the flow may proceed to 120 in which $D_2$ may be calculated. If expression at 115 is not satisfied, then the flow may revert back to 105 in which $W_{1,j}$ may be updated. According to other embodiments, $W_2$ may be calculated under high SNR conditions. Alternatively, in other embodiments, $W_2$ may be optional, and omitted if high SNR conditions are not present.

According to certain embodiments, $D_2$ may be essential under certain criteria. However, according to other embodiments, $D_2$ may be optional. For example, $D_2$ may be needed when the MUI is not the dominant performance degradation. If the UE is under high-SNR conditions, and if its relative orthogonality with other UEs is low, then $D_2$ may not be needed.

The UE may know its own SNR condition by, for example, direct measurement. However, the UE may not know the MUI level. Thus, the UE may not be able to decide by itself whether to use $D_2$ or not. According to certain embodiments, one possibility that the UE may know the MUI level is if the base station signals MUI levels towards each corresponding UE together with the receiver weights. This signaling may be somewhat similar to channel quality indicator (CQI), but in the opposite direction.

According to certain embodiments, the transmission of the derived receiver weights ($D_1$) towards UEs can be realized by various methods. For example, according to certain embodiments, the receiver weights, which are derived at the base station, can be signaled explicitly towards each corresponding scheduled UE on different resources via maximum ratio transmission (MRT)-based precoding on the physical downlink control channel (PDCCH). The weights can be transmitted with quantization, which can be based on a common codebook known by both the base station and the UE in order to minimize the signaling overhead.

According to other embodiments, each UE can be assigned a UE-specific reference signal (RS) on different antenna ports. The base station can select the precoders by $W_1=H_{est}^{-1}$ and $W_2=D_1$. Hence, the effective channel at the $j^{th}$ UE becomes $H_{eff,j} \approx D_{1,j}$ for each j. The UEs can measure the receiver weights via channel estimation by UE-specific RS. During this signaling subframe, data transmission can also be realized on the physical downlink shared channel (PDSCH) with this signaling precoder. When the signaling of the receiver weights is complete at every UE, for example, within one subframe, the base station may switch over to the derived precoders ($W_1$ and $W_2$).

Figure 3:
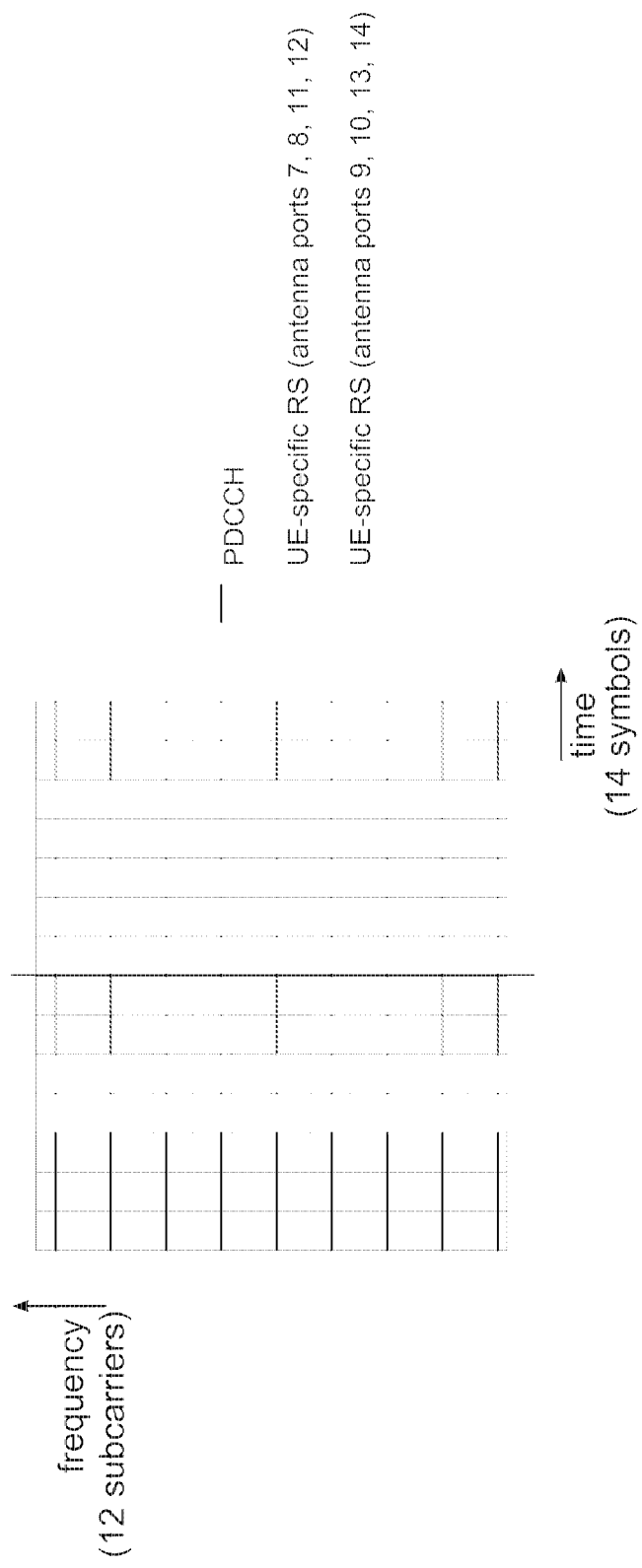
FIG. 3 illustrates resource allocation according to certain embodiments.

FIG. 3 illustrates resource allocation according to certain embodiments. In particular, FIG. 3 illustrates resource allocation of a physical resource block (PRB) in one subframe with PDCCH and UE-specific RS for 8 transmit antennas according to certain embodiments. Here, the UE-specific RS may correspond to antenna ports 7, 8, 11 and 12. Other UE-specific RS may correspond to antenna ports 9, 10, 13 and 14. Each antenna port may correspond to a different layer, such as, for example, different UE or different layers of the same UE. Thus, every UE may receive a different UE-specific RS, up to 8 UEs in certain embodiments. However, different UE-specific RS can be transmitted on the same resource element. Thus, antenna ports 7, 8, 11 and 12 can all use the same resource elements, but each transmitting a different UE-specific RS. In FIG. 3, there can be eight different UE-specific RS, but each four of them may use the same resource elements. Other signals can be present in the subframe but are not indicated here for simplicity, including, for example, cell-specific reference signals (CRS), primary synchronization signal (PSS), static synchronization signal (SSS), physical broadcast channel (PBCH), physical hybrid automatic repeat request (ARQ) indicator channel (PHICH), physical control format indicator channel (PCFICH), and CSI-RS.

Figure 4:
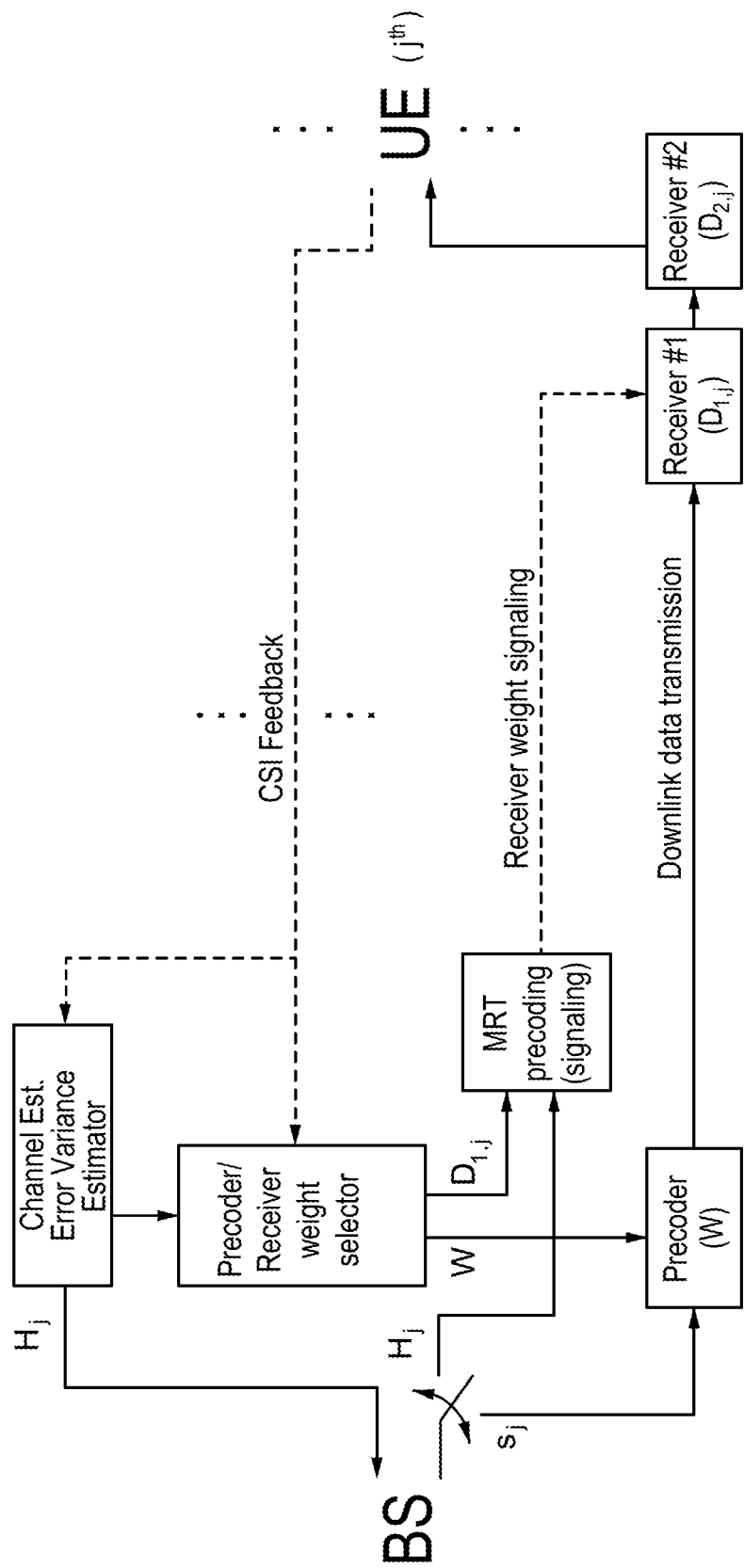
FIG. 4 illustrates a signaling chart according to certain embodiments.
Figure 5:
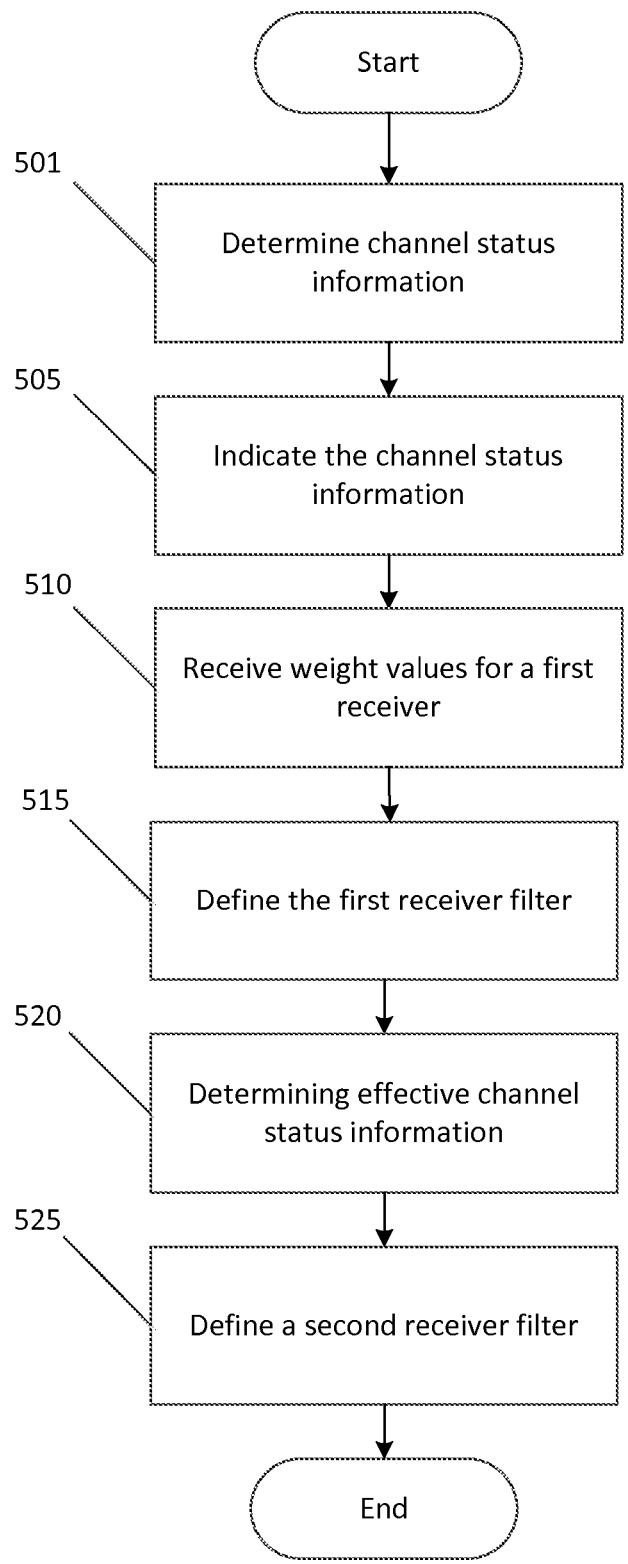
FIG. 5 illustrates a method according to certain embodiments.

FIG. 4 illustrates a signaling diagram between BS-UE according to certain embodiments. Upon the indication of receiver weights, the base station may trigger the MU transmission via the derived precoder. Each UE may effectively apply the second conventional receiver in order to maximize its instantaneous SINR based on the effective channel incorporating the residual MUI as well as interference from other transmitters, such as inter-cell interference, etc., and thermal noise FIG. 5 illustrates a method according to certain embodiments. FIG. 5 more specifically illustrates a method for MU-MIMO operation in a receiver. As shown in FIG. 5, the method may include, at 501, determining channels status information of a current connection. The method may also include, at 505, indicating the channel status information to a transmitter. The method may further include, at 510, receiving weight values for a first receiver filter, in response to the channel status information. The method may also include, at 515, defining the first receiver filter based on the weight values. The method may further include, at 520, determining effective channel status information of a current connection, and interference from other transmitters. The method may also include, at 525, defining a second receiver filter designed for maximizing the instantaneous SINR at the receiver node taking into account its effective channel with residual MUI as well as any other external sources of impairments.

Figure 6:
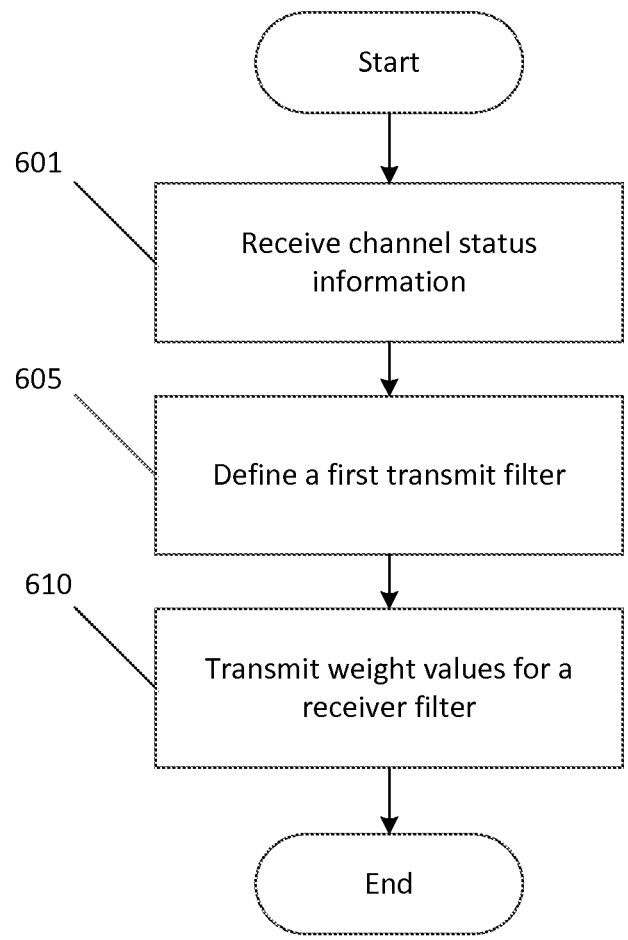
FIG. 6 illustrates another method according to certain embodiments.

FIG. 6 illustrates another method according to certain embodiments. FIG. 6 more specifically illustrates a method for MU-MIMO operation in a transmitter. As shown in FIG. 6, the method may include, at 601, receiving channel status information from a receiver. The method may also include, at 605, defining a first transmit filter based on the channel status information. The method may further include, at 610, transmitting weight values for a receiver filter of the receiver.

Figure 7:
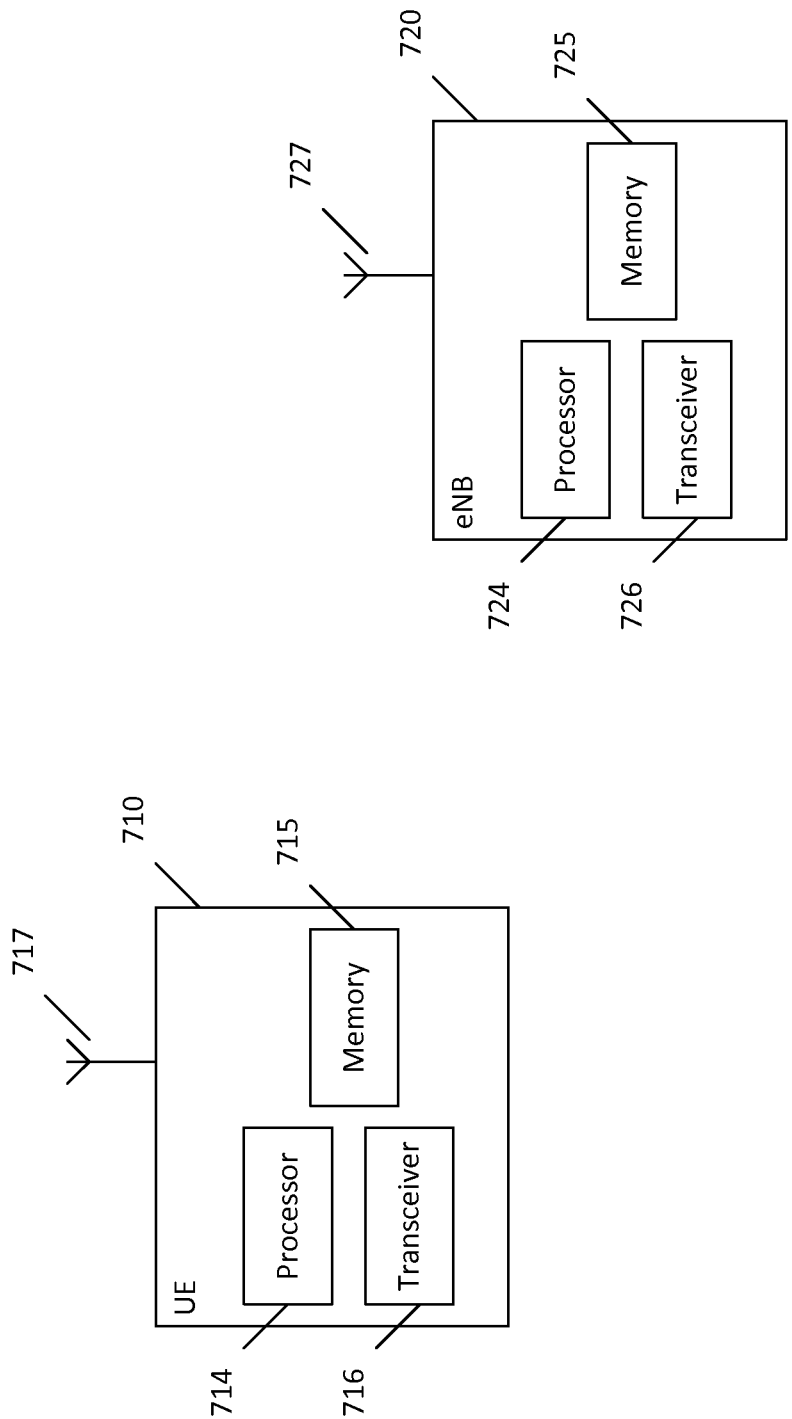
FIG. 7 illustrates a system according to certain embodiments.

FIG. 7 illustrates a system according to certain embodiments. In one embodiment, a system may include multiple devices, such as, for example, at least one UE 710 and at least one evolved Node B (eNB) 720, other base stations or access points, or any device with transmitter or receiver functionality. In certain systems, only UE 710 and eNB 720 may be present, and in other systems, UE 710, eNB 720, and a plurality of other user equipment may be present. Other configurations are also possible.

Each of these devices may include at least one processor, respectively indicated as 714 and 724. At least one memory can be provided in each device, as indicated at 715 and 725, respectively. The memory may include computer program instructions or computer code contained therein. The processors 714 and 724, and memories 715 and 725, or a subset thereof, can be configured to provide means corresponding to the various blocks of FIGS. 5 and 6, and any other method(s) and computational step(s) described above. Although not shown, the devices may also include positioning hardware, such as a global positioning system (GPS) or micro electrical mechanical system (MEMS) hardware, which can be used to determine location of the device. Other sensors are also permitted and can be included to determine location, elevation, orientation, and so forth, such as barometers, compasses, and the like.

As shown in FIG. 7, transceivers 716 and 726 can be provided, and each device may also include at least one antenna, respectively illustrated as 717 and 727. The device may have many antennas, such as an array of antennas configured for MIMO communications, or multiple antennas for multiple radio access technologies. Other configurations of these devices, for example, may be provided.

Transceivers 716 and 726 can each, independently, be a transmitter, a receiver, or both a transmitter and a receiver, or a unit or device that is configured both for transmission and reception.

Processors 714 and 724 can be embodied by any computational or data processing device, such as a central processing unit (CPU), application specific integrated circuit (ASIC), or comparable device. The processors can be implemented as a single controller, or a plurality of controllers or processors.

Memories 715 and 725 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 710 and eNB 720, to perform any of the processes described above (see, for example, FIGS. 5 and 6). Therefore, in certain embodiments, a non-transitory computer-readable medium can be encoded with computer instructions that, when executed in hardware, perform a process such as one of the processes described herein. Alternatively, certain embodiments can be performed entirely in hardware.

Furthermore, although FIG. 7 illustrates a system including a UE 710 and an eNB 720, certain embodiments may be applicable to other configurations, and configurations involving additional elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

ASIC Application Specific Integrated Circuit
ARQ Automatic Repeat Request
BS Base Station
CPU Central Processing Unit CQI Channel Quality Indicator
CRS Cell-Specific Reference Signals
CSI Channel State Information
DPC Dirty-Paper Coding
eNB Evolved Node B
GPS Global Positioning System
HDD Hard Disk Drive
IRC Interference Rejection Combiner
LMMSE Linear Minimum Mean Square Error
LTE Long Term Evolution
MAP Maximum A Posteriori
MEMS Micro Electrical Mechanical System
MIMO Multiple-Input and Multiple-Output
MMSE Minimum Mean Square Error
MRC Maximum Ratio Combining
MRT Maximum Ratio Transmission
MSE Mean Square Error
MUI Multi-User Interference
MU-MIMO Multi-User Multiple-Input and Multiple-Output
PBCH Physical Broadcast Channel
PCFICH Physical Control Format Indicator Channel
PDCCH Physical Downlink Control Channel
PDSCH Physical Downlink Shared Channel
PHICH Physical Hybrid Automatic Repeat Request Indicator Channel
PRB Physical Resource Block
PSS Primary Synchronization Signal
RAM Random Access Memory
RS Reference Signal
SINR Signal-to-Interference Plus Noise Ratio
SNR Signal-to-Noise Ratio
SSS Secondary Synchronization Signal
SVD Singular Value Decomposition
TDD Time Division Duplex
TMSE Total Mean Square Error
UE User Equipment

We claim:

1. A method comprising:
determining channel status information of a current connection;
indicating the channel status information to a transmitter;
receiving weight values for a first receiver filter, in response to the channel status information;
defining the first receiver filter based on the weight values;
determining effective channel status information of a current connection, and interference from other transmitters; and
defining a second receiver filter based on the weight values, the effective channel status information of the current connection, and the interference,
wherein the first receiver filter is configured to mitigate multi-user interference.

2. The method of claim 1, wherein the weight values are based on a codebook.

3. The method of claim 1, further comprising:
receiving data for at least one multi-user multiple-input and multiple output scheduled user equipment, wherein the data is based on the weight values.

4. The method of claim 1, further comprising:
applying the weight values to a receiver.

5. The method of claim 1, wherein the first receiver filter is defined based on a minimum mean square error criterion.

6. The method of claim 1,
wherein the second receiver filter is configured to maximize a gain of a useful signal.

7. A method comprising:
receiving channel status information from a receiver;
defining a first transmit filter based on the channel status information;
transmitting weight values for a receiver filter of a receiver; and
defining a second transmit filter when a certain criteria relating to the receiver filter is fulfilled,
wherein the first transmit filter and the receiver filter are configured to mitigate multi-user interference.

8. The method of claim 7, wherein the transmitting weight values are based on a codebook.

9. The method of claim 7, further comprising:
scheduling user equipment for multi-user multiple-input and multiple output transmission;
sending related scheduling information; and
transmitting data for each multi-user multiple-input and multiple-output scheduled user equipment with the weight values.

10. The method of claim 7, wherein the first transmit filter is defined based on a minimum mean square error criterion.

11. The method of claim 7, wherein the second transmit filter is configured to maximize a gain of a useful signal.

12. The method of claim 7, wherein the certain criteria corresponds to a high signal-to-noise ratio environment.

13. A method comprising:
receiving channel status information from a receiver;
defining a first transmit filter based on the channel status information; and
transmitting weight values for a receiver filter of a receiver,
wherein the first transmit filter and the receiver filter are configured to mitigate multi-user interference.

14. An apparatus, comprising:
at least one processor; and
at least one memory including computer program code,
wherein the at least one memory and the computer program code are configured to, with the at least one processor, cause the apparatus at least to
determine channel status information of a current connection;
indicate the channel status information to a transmitter;
receive weight values for a first receiver filter, in response to the channel status information;
define the first receiver filter based on the weight values;
determine effective channel status information of a current connection, and interference from other transmitters; and
define a second receiver filter based on the weight values, the effective channel status information of the current connection, and the interference,
wherein the first receiver filter is configured to mitigate multi-user interference.

15. The apparatus of claim 14, wherein the weight values are based on a codebook.

16. The apparatus of claim 14, wherein the at least one memory and the computer program code are configured to, with the at least one processor cause the apparatus at least to receive data for at least one multi-user multiple-input and multiple-output scheduled user equipment, wherein the data is based on the weight values.

17. The apparatus of claim 14, wherein the at least one memory and the computer program code are configured to, with the at least one processor cause the apparatus at least to apply the weight values to a receiver.

18. An apparatus, comprising:
at least one processor; and
at least one memory including computer program code,
wherein the at least one memory and the computer program code are configured to, with the at least one processor, cause the apparatus at least to
receive channel status information from a receiver;
define a first transmit filter based on the channel status information;
transmit weight values for a receiver filter of the receiver; and
define a second transmit filter when a certain criteria relating to the receiver filter is fulfilled,
wherein the first transmit filter and the receiver filter are configured to mitigate multi-user interference.

19. The apparatus of claim 18, wherein the transmission of weight values is based on a codebook.

20. The apparatus of claim 18, wherein the certain criteria corresponds to a high signal-to-noise ratio environment.

21. An apparatus, comprising:
at least one processor; and
at least one memory including computer program code,
wherein the at least one memory and the computer program code are configured to, with the at least one processor, cause the apparatus at least to
receive channel status information from a receiver;
define a first transmit filter based on the channel status information;
transmit weight values for a receiver filter of the receiver;
schedule user equipment for multi-user multiple-input and multiple output transmission;
send related scheduling information; and
transmit data for each multi-user multiple-input and multiple-output scheduled user equipment with the weight values.

* * * * *